US007318162B2

(12) United States Patent
Rineer et al.

(10) Patent No.: US 7,318,162 B2
(45) Date of Patent: Jan. 8, 2008

(54) COMPUTER-IMPLEMENTED SYSTEM AND METHOD FOR MANAGING DATA INTEGRITY VALIDATION RULES

(75) Inventors: Brian C. Rineer, Apex, NC (US);
Brent C. Jackson, Raleigh, NC (US);
Scott A. Gidley, Cary, NC (US);
Anthony F. Fisher, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 867 days.

(21) Appl. No.: 10/324,134

(22) Filed: Dec. 18, 2002

(65) Prior Publication Data

US 2004/0123101 A1 Jun. 24, 2004

(51) Int. Cl.
*G06F 12/14* (2006.01)
*G06F 11/30* (2006.01)
*G06F 7/00* (2006.01)
*G06F 17/30* (2006.01)

(52) U.S. Cl. .................. 713/193; 707/101; 707/203
(58) Field of Classification Search ............... 713/193; 707/101, 203
See application file for complete search history.

(56) References Cited

U.S. PATENT DOCUMENTS

| | | | |
|---|---|---|---|
| 4,704,703 A * | 11/1987 | Fenwick | 714/48 |
| 5,159,669 A * | 10/1992 | Trigg et al. | 715/814 |
| 5,404,509 A * | 4/1995 | Klein | 707/101 |
| 5,787,437 A | 7/1998 | Potterveld et al. | |
| 5,881,230 A | 3/1999 | Christensen et al. | |
| 6,016,477 A | 1/2000 | Ehnebuske et al. | |
| 6,134,594 A | 10/2000 | Helland et al. | |
| 6,151,602 A | 11/2000 | Hejlsberg et al. | |
| 6,167,405 A | 12/2000 | Rosensteel, Jr. et al. | |
| 6,208,990 B1 | 3/2001 | Suresh et al. | |
| 6,212,524 B1 | 4/2001 | Weissman et al. | |
| 6,418,450 B2 | 7/2002 | Daudenarde | |
| 6,473,748 B1 | 10/2002 | Archer | |
| 6,473,794 B1 * | 10/2002 | Guheen et al. | 709/223 |
| 6,601,065 B1 * | 7/2003 | Nelson et al. | 707/4 |
| 6,606,744 B1 * | 8/2003 | Mikurak | 717/174 |
| 6,615,220 B1 * | 9/2003 | Austin et al. | 707/104.1 |
| 6,671,818 B1 * | 12/2003 | Mikurak | 714/4 |
| 7,020,869 B2 * | 3/2006 | Abrari et al. | 717/108 |
| 7,043,499 B1 * | 5/2006 | Nelson et al. | 707/102 |
| 2002/0069077 A1 * | 6/2002 | Brophy et al. | 705/1 |

* cited by examiner

*Primary Examiner*—Gilberto Barrón, Jr.
*Assistant Examiner*—Virgil Herring
(74) *Attorney, Agent, or Firm*—Jones Day

(57) ABSTRACT

A computer-implemented system and method for customizing rules used in data integrity validation operations. A data integrity validation application uses the data integrity validation rules to perform the data integrity validation operations. The data integrity validation rules are stored in a knowledge base which is separate from and external to the data integrity validation application. The separately stored and externally located knowledge base allows customization of the data integrity validation rules without requiring recompilation of the data integrity validation application.

30 Claims, 18 Drawing Sheets

Fig. 18

| Type: Element | Scheme: ENUSA Name Prefix | Entries: 38 |
|---|---|---|
| Data | | Standard |
| BR | | BR |
| BROTHER | | BR |
| CAPT | | CAPT |
| CAPTAIN | | CAPT |
| CPT | | CAPT |
| DOCT | | DR |
| DOCTOR | | DR |
| DR | | DR |
| FATHER | | FR |
| FR | | FR |
| HON | | HON |
| HONORABLE | | HON |
| MASTER | | MASTER |
| MESSRS | | MR AND MR |
| MISS | | MISS |
| MISSES | | MRS |
| MISSUS | | MRS |
| MISTER | | MR |
| MONSIGNOR | | MSGR |
| MR | | MR |
| MR & MRS | | MR AND MRS |
| MR AND MRS | | MR AND MRS |
| MRS | | MRS |
| MS | | MS |
| MSGR | | MSGR |
| OFCR | | OFCR |
| OFFICER | | OFCR |
| PROF | | PROF |
| PROFESSOR | | PROF |
| RABBI | | RABBI |
| REV | | REV |
| REVEREND | | REV |
| SERGEANT | | SGT |

COMPUTER-IMPLEMENTED SYSTEM AND METHOD FOR MANAGING DATA INTEGRITY VALIDATION RULES

TECHNICAL FIELD

The present invention relates generally to computer databases and data processing systems. More particularly, the present invention relates to performing data integrity validation operations within data storage systems.

BACKGROUND

Among their many functions, data management systems contain software routines that help improve data integrity within an enterprise. Data integrity is the condition that exists when data are complete, correct, consistent, and current. Data integrity can also be described as the expectation of data quality relative to a specified data processing operation. Data integrity can be compromised by human errors during data entry, errors that occur during the transfer of data from one computer program to another, inconsistencies in data processing operations, software bugs, and hardware malfunctions.

There are many ways to minimize threats to data integrity. These include controlled access through security mechanisms, design of user interfaces that prevent data entry errors, and regular backups. Sophisticated data management software can also help reduce risks to data integrity. Despite these measures, however, it is inevitable that unique situations will arise wherein data integrity will be compromised.

SUMMARY

In accordance with the teachings provided herein, a system and method are provided to assist in ensuring data integrity. The system and method allow rules to be used by a data integrity validation application in order to perform data integrity validation operations. The data integrity validation rules are stored in a knowledge base which is separate from and external to the data integrity validation application. The separately stored and externally located knowledge base allows customization of the data integrity validation rules without requiring recompilation of the data integrity validation application.

BRIEF DESCRIPTION OF THE DRAWINGS

FIGS. 6–18 are graphical user interfaces depicting exemplary screens from the data integrity validation rules customization toolset.

DETAILED DESCRIPTION

Figure 1:
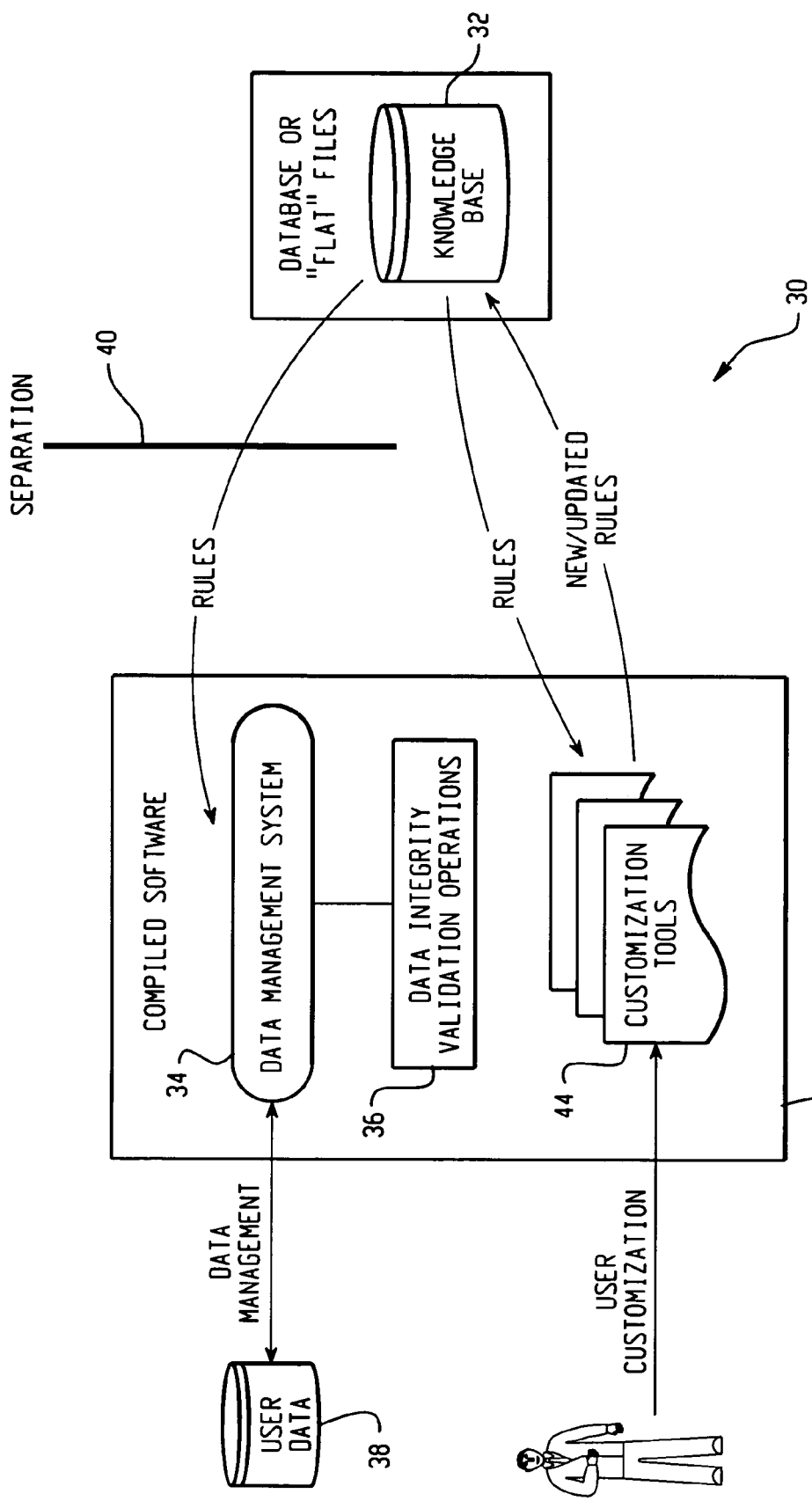
FIG. 1 is a block diagram depicting software and computer components utilized in a data integrity validation rules customization system.

FIG. 1 depicts a computer-implemented system 30 that stores, implements, and customizes rules for data integrity validation operations 36. In this computer-implemented system 30 (e.g., a data integrity validation rules customization system), rules are stored in a knowledge base 32 that is external to the compiled data integrity validation operations 36 (e.g., application logic) contained within the data management system 34. The compiled data integrity validation operations 36 (e.g., an application) contains an engine that is capable of accessing rules in the knowledge base 32 and applying the rules to perform data integrity validation operations upon data 38.

The knowledge base 32 may be implemented in a database, as a set of flat files, or in any other conventional storage format. The design of the knowledge base 32 is such that it is extensible—that is, existing types of rules may be added or updated, as well as allowing new types of rules to be defined. The separate and external nature of the knowledge base 32 relative to the compiled data management system is indicated at 40. This approach allows the rules to be customized without requiring recompilation or redistribution of the system 34.

Rules contain logic and knowledge needed to perform data integrity validation operations. These operations include analysis and transformation. To guide the data integrity validation process, rules in the knowledge base 32 may contain analysis reference materials and transformation specifications. Analysis reference materials may include lookup tables, pattern-match regular expressions, character-handling tables, natural language parsing patterns, numeric ranges, and statistical analysis algorithms. For example, rules may locate data records whose values are beyond some specified number of standard deviations. Transformation specifications may include pattern-match/replace regular expressions, transformation tables, phonetic reduction rules, and "if-then" clauses. For example, data integrity validation operations may render data values in "proper case" using rules to determine which words should be rendered in a format that differs from the traditional proper case (first letter uppercase, remaining letters lowercase—e.g., "MR." is transformed into "Mr."). Finally, metadata logic rules in the knowledge base 32 may define the ways in which other rules are combined for use in a single context-sensitive operation.

At system start-up, rules from the knowledge base 32 are read by the data integrity validation operations 36 located in the data management system 34. The compiled data integrity validation operations 36 (e.g., software routine(s)) perform the data integrity validation operations based upon rules that are retrieved from the knowledge base 32 and provide a callable interface for these operations. Optionally, the compiled data integrity validation operations 36 may read the entire contents of the knowledge base 32 at startup and create in-memory structures to store data integrity validation rules for fast run-time access; or the system may instead use random access at run-time to retrieve rules in the knowledge base only as they are needed. It is noted that the data management system 34 or application may have a plurality of software modules, wherein at least one of the software modules performs data integrity validation operations.

The compiled software system 42 also may include a set of customization tools 44 that access rules in the knowledge base 32 and provide a user-friendly test interface to customize the rules as well to debug operations defined by the rules. In the debugging role, the interface may be used to view intermediate results of operations (such as resultant data values) and thus isolate the effects of specific rules. The user may thereby identify a specific rule or rules that require updates in order to achieve optimal results. The user may then update the knowledge base's rule or rules in question using the editing facilities of the customization tools 44. It should be noted that optionally the knowledge base 32 is separate from and located externally to the customization tools 44. The customization tools 44 may also form the same compiled software package as the data management system 34 or be separately compiled.

Figure 2:
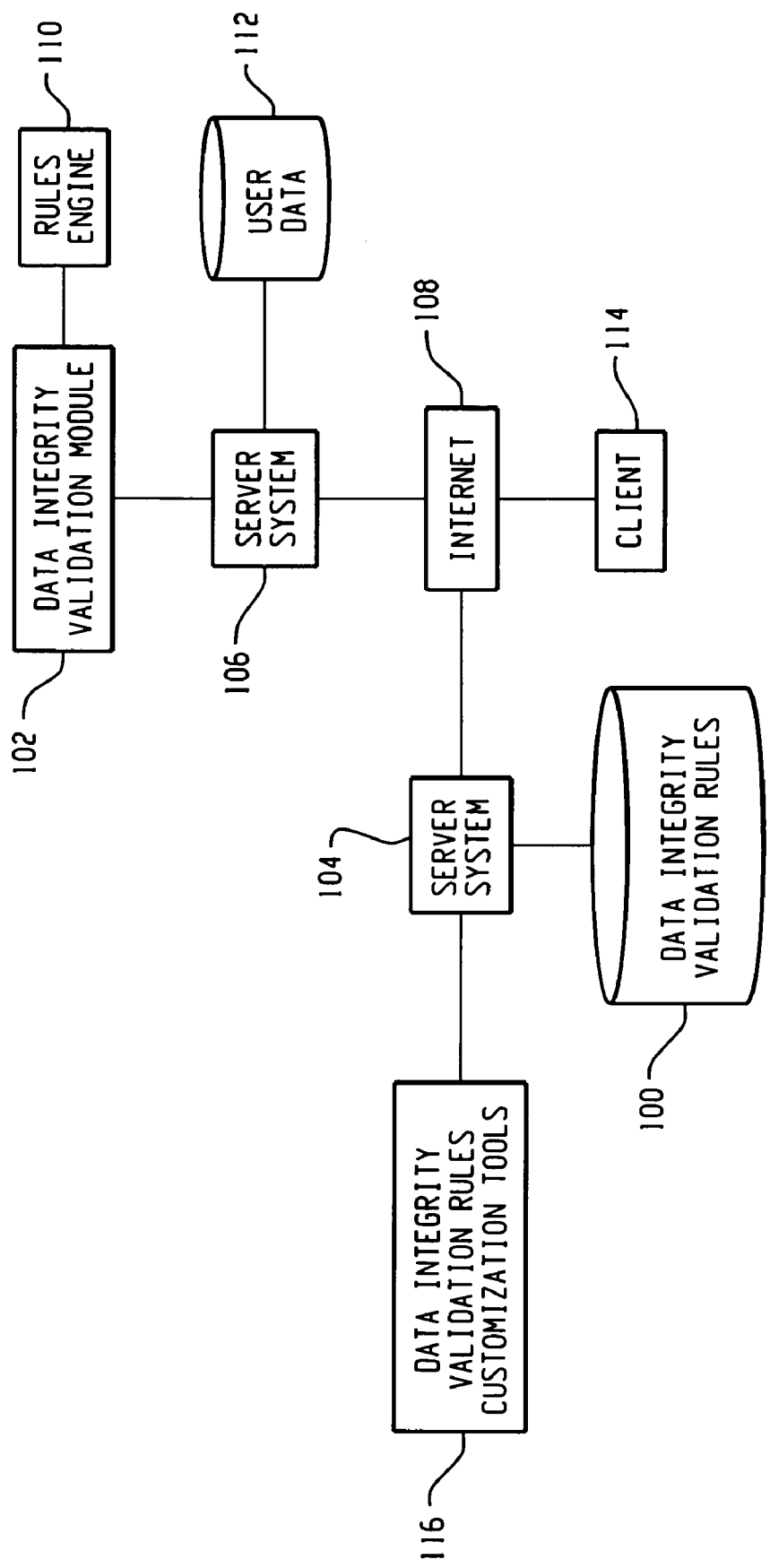
FIGS. 2 and 3 are block diagrams illustrating different architectural configurations involving the data integrity validation rules customization system.
Figure 3:
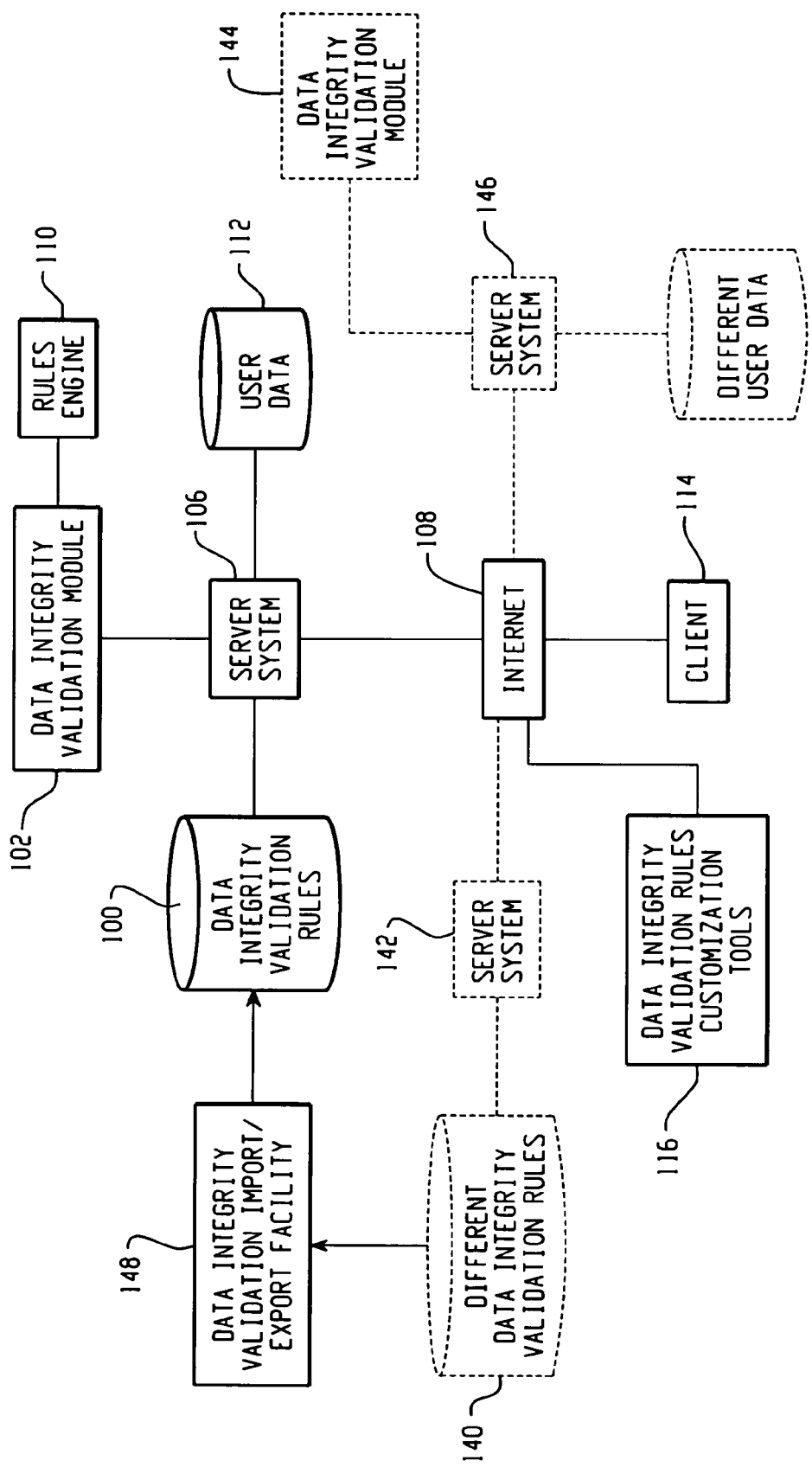

FIGS. 2 and 3 illustrate that many architectural configurations are possible with the data integrity validation rules customization system. With reference to FIG. 2, data integrity validation rules 100 are separate from and located externally from the software (e.g., data integrity validation module 102) that performs data integrity validation. The terms "separate from" and "located externally" are meant in a broad context so as to generally include those configurations that allow users to adapt and/or extend data integrity validation rules to meet needs specific to the format of their data, without requiring intervention by the software vendor (so as to recompile the data management system or data integrity validation module(s)). The data integrity validation rules 100 may be located on a server system 104 that is different from the server system 106 housing the data integrity validation module 102.

The data integrity validation module 102 may access the remotely located data integrity validation rules 100 over an Internet connection 108 (or other network connection, such as a local area network). Once accessed, the rules engine 110 of the data integrity validation module 102 can perform data integrity operations upon the user data 112. If a unique situation arises which necessitates a change to the data integrity validation rules 100, then a user using a web browser (or other interface on a client computer 114) may access the data integrity validation rules customization tools 116 to modify one or more data integrity validation rules 100.

FIG. 3 shows data integrity validation rules 100 that are separate from and located externally from the data integrity validation module 102 although the data integrity validation rules 100 and data integrity validation module 102 are located on the same server system 106. Other data integrity validation rules 140 may operate on the same server system 106 or may be located on a separate server system 142. The other rules 140 represent data integrity validation rules that have been customized differently than the data integrity validation rules 100. In this way, different companies or different divisions within the same company may customize their own set of data integrity validation rules without interfering with another's data integrity validation rules. The other data integrity validation rules 140 may also be utilized by a data integrity validation module 144 operating on another server system 146. Depending upon the situation at hand, the data integrity validation module 102 may also wish to access the other data integrity validation rules 140. The data integrity validation module 102 may do this by directly accessing the different data integrity validation rules 140 through the server system 142. Optionally, a data integrity validation rule import/export software facility 148 may be provided that copies or transfers data integrity validation rules from a knowledge base 140 to another knowledge base 100; thereafter the data integrity validation module 102 may access the data integrity validation rules from the knowledge base 100.

Figure 4:
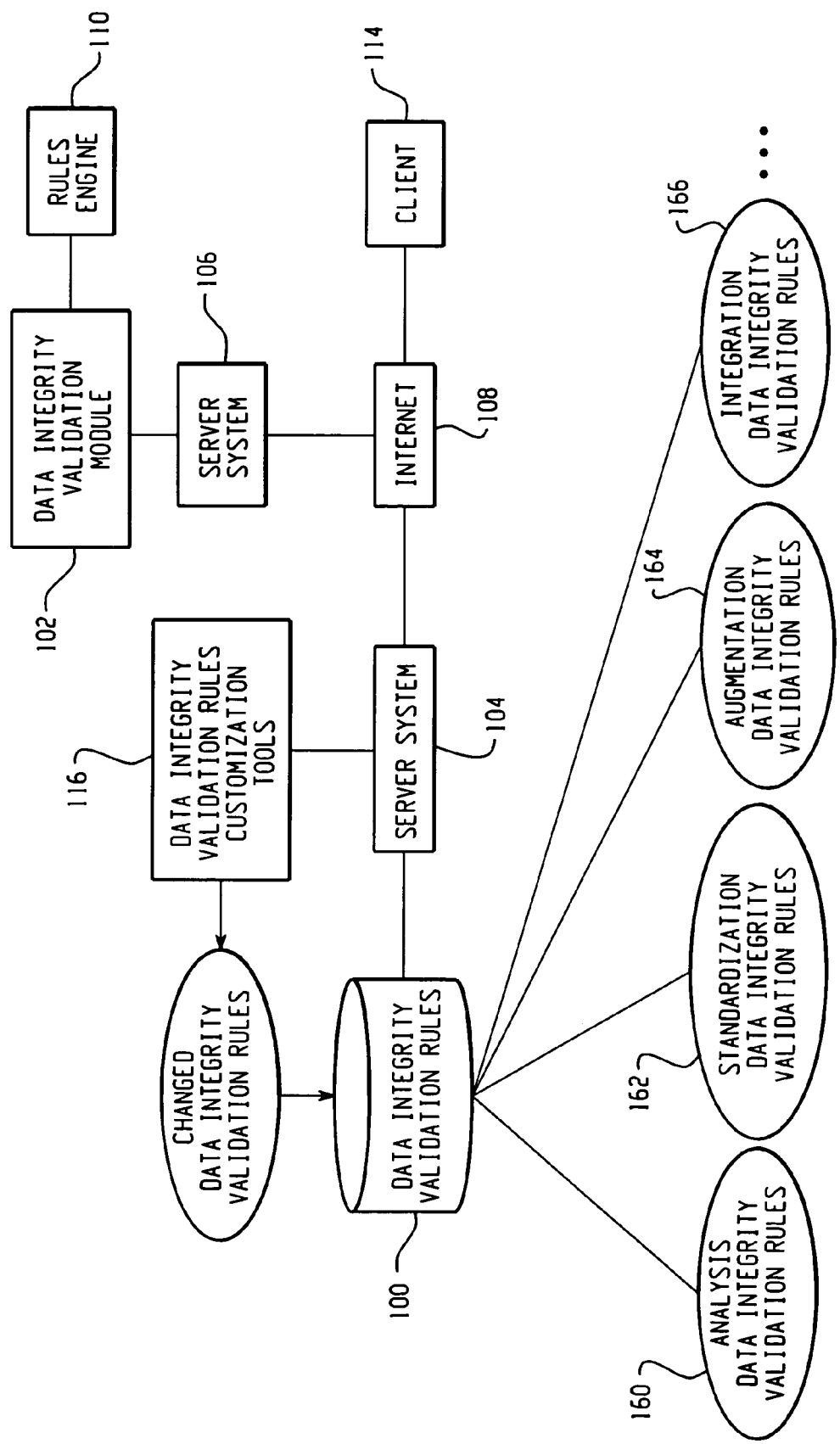
FIG. 4 is a block diagram illustrating different types of data integrity validation rules being used with a data integrity validation rules customization system.

FIG. 4 illustrates that many different types of data integrity validation rules may be used by a data integrity validation system. Typical operations of a data integrity validation system include analysis, standardization, augmentation, and integration. Examples of each of these operations and use of corresponding rules (160, 162, 164, 166) are described below. However, it should be understood that other types of operations and rules may be used by a data integrity validation system.

An example of an analysis operation and set of analysis-related data integrity validation rules 160 used by a data integrity validation application includes gender analysis. Using rules, the system may attempt to determine the gender associated with a name by analyzing the semantic values of components of the name. For instance:

| Name | Gender |
|---|---|
| Ms. Pat Jones | Female |
| Pat Jones | Unknown |
| Pat Jones, Jr. | Male |

Corrections to invalid gender values can help a user avoid addressing customers with the wrong salutation, or identify logical errors in a database, such as instances where a male is listed as a pregnant patient.

The system may access the rules to attempt to classify the semantic nature of a data value. For instance, the system might determine whether a data value represents the name of an individual or the name of an organization:

| Data Value | Type |
|---|---|
| XYZ Corporation | Organization |
| Mr. Smith | Individual |
| Mister Coffee | Organization |

Identification of semantic data types can help a user avoid embarrassing mistakes such as sending a letter to "Dear Mr. XYZ Corporation".

The system may access rules to verify that a numeric value is within a specified range. For example, if the salary range corresponding to the title "Staff Engineer" is $50,000-$65,000, the system can locate incorrect salary values for employees listed with the "Staff Engineer" title:

| Employee Name | Title | Salary |
|---|---|---|
| John Doe | Staff Engineer | 57,000 |
| Jane Doe | Staff Engineer | 70,000 |
| William Smith | Staff Engineer | 61,000 |

In cases where an exact range is not specified, the system may apply statistical analysis techniques to identify potentially incorrect values. For example, consider the following list of book prices in an inventory database:

| Item | Description | Inventory No. | Price |
|---|---|---|---|
| Book | Ivanhoe | 10045081 | 8.75 |
| Book | David Copperfield | 10045262 | 13.50 |
| Book | War and Peace | 10045887 | 3000.00 |

In this instance the system may access rules to identify the third record as potentially invalid because the price differs from the mean price of all books by more than some specified number of standard deviations.

Results of analysis operations are often shown in a reporting interface. The system might also include an automatic correction facility to update values that are found to be in error.

An example of a standardization operation and set of standardization-related data integrity validation rules 162 used by a data integrity validation application includes transformations to preferred representations or abbreviations. The system may access rules to transform data values to preferred representations, such as in the table shown below:

| Original Value | Standard Value |
|---|---|
| The XYZ Corporation | XYZ Corp |
| Pat Jones, Junior | Pat Jones Jr |

The system may render data values in "proper case" using rules to determine which words should be rendered in a format that differs from the traditional proper case (first letter uppercase, remaining letters lowercase). For instance, the system might change the case of a company name as follows:

| Original Value | Standard Value |
|---|---|
| aaa carolinas | AAA Carolinas |

An example of an augmentation operation and set of augmentation-related data integrity validation rules 164 used by a data integrity validation application includes address augmentation. The system may use rules to analyze an address and attach a ZIP+4 extension to an existing ZIP code:

| Original Address | Augmented Address |
|---|---|
| 4001 Weston Parkway, Suite 300 Cary, NC 27513 | 4001 Weston Parkway, Suite 300 Cary, NC 27513-2311 |

The system may also access rules to attach geographical information (latitude, longitude) or other postal information (county, delivery point bar codes, etc.).

An example of an integration operation and integration-related set of data integrity validation rules 166 used by a data integrity validation application includes record matching. The system may generate a report of potential duplicate records within a database:

| Cluster | Name | Company | Address |
|---|---|---|---|
| 1 | Mr. William Smith | XYZ Corporation | 100 Main St |
| 1 | Bill Smith | The XYZ Corp | 100 Main Street Suite 10 |
| 2 | John Doe | ABC | 26 Grand Boulevard |
| 2 | Dr. Jonathon Doe | | 26 Grand Blvd |
| 2 | Jon Doe, MD | ABC Company | 26 Grande Blvd. |

The system may automatically merge data from records in a cluster of duplicates and purge redundant records:

| Original | | | |
|---|---|---|---|
| Group | Name | Company | Address |
| 2 | John Doe | ABC | 26 Grand Boulevard |
| 2 | Dr. Jonathon Doe | | 26 Grand Blvd |
| 2 | Jon Doe, MD | ABC Company | 26 Grande Blvd. |

| After De-duplication | | | |
|---|---|---|---|
| Group | Name | Company | Address |
| 2 | Dr. Jonathon Doe, MD | ABC Company | 26 Grand Boulevard |

Like record matching and de-duplication routines, consolidation routines identify records that contain semantically identical values. In a consolidation routine, however, records from different data sources are automatically combined when data from two or more sources are merged:

TABLE 1

| Name | Company | Phone |
|---|---|---|
| Mr. William Smith | XYZ Corporation | 800 222-1212 |
| Dr. Jonathon Doe | ABC | 212 663-5555 |
| Jane Doe | XYZ Corporation | 800 222-1234 |

TABLE 2

| Name | Company | Address |
|---|---|---|
| Harry Jones | 123 Inc. | 1240 Broadway |
| Jon Doe, MD | ABC Company | 26 Grande Blvd. |

NEW TABLE

| Name | Company | Address | Phone |
|---|---|---|---|
| Mr. William Smith | XYZ Corporation | 100 Main St | 800 222-1212 |
| Dr. Jonathon Doe, MD | ABC Company | 26 Grand Blvd | 212 663-5555 |
| Jane Doe | XYZ Corporation | 100 Main St | 800 222-1234 |
| Harry Jones | 123 Inc. | 1240 Broadway | 202 999-9898 |

It is noted that one or more data integrity validation operations and rules may also be termed data cleansing operations and rules (e.g., standardization, de-duplication, corrections made after range checking, statistical analysis, gender analysis, identification analysis).

As these examples demonstrate, a data integrity validation application requires a considerable amount of subject-specific knowledge and logic in order to accurately perform data integrity validation operations. The system needs to have access to a priori knowledge of the semantic meaning of words, expected word patterns, numeric ranges, transformation logic, and so on. A data integrity validation rule may be considered a unit of data integrity validation knowledge or logic. A data integrity validation knowledge base is a collection of rules that can be accessed by a data integrity validation application. In order for a data integrity validation application to be effective, it accesses a knowledge base containing a vast amount of rules. The knowledge base may contain a wide range of types of rules—synonyms, abbreviations, natural language parsing rules, transformation specifications, phonetic reduction rules, numeric ranges, statistical analysis algorithms, and so on. Further, rules in the knowledge base may be organized into context-sensitive domains. For example, when performing de-duplication operations, the system may access rules that allow it to recognize that these values represent the same name:
Bill Smith
William Smith The system may reference a rule that identifies "Bill" as a diminutive form of the given name "William". Note, however, that the system may access a different set of rules in order to recognize that these address values are not duplicates:
100 Bill Street
100 William Street In the semantic context example of address processing, there is no rule that identifies "Bill" as an alternate representation of "William". Further, in order to process multi-national data, the knowledge base may have rules organized into additional contexts that apply to data formats that occur in various languages and localities.

The size and complexity of a knowledge base required by an effective data integrity validation application make it very difficult for software vendors to deliver systems that work well for every user's data storage system. It is normally beyond the capacity of the software vendor (or other provider) to anticipate the types of data integrity problems that all users might experience. Once a system is employed in multiple enterprises, it is inevitable that unexpected data integrity problems will be encountered. Users may have types or formats of data unknown to the system vendor, requiring new rules that allow a system to process data in novel ways. Changes to the way data is processed within the enterprise may lead to a need for new rules. Even in cases where the general approach of the rules in the initially delivered knowledge base is adequate, the user may have a desire to enhance the system's performance by adding more rules to the knowledge base as insight is acquired over time. The data integrity validation rules customization system eases the addition and/or modification of data integrity validation and data integrity rules by among other things averting implementing rules as programmed software code, internal to the system itself. This obviates having to implement changes in the knowledge base as changes require a computer programmer to write new software code, after which the system must be recompiled and redistributed.

Figure 5:
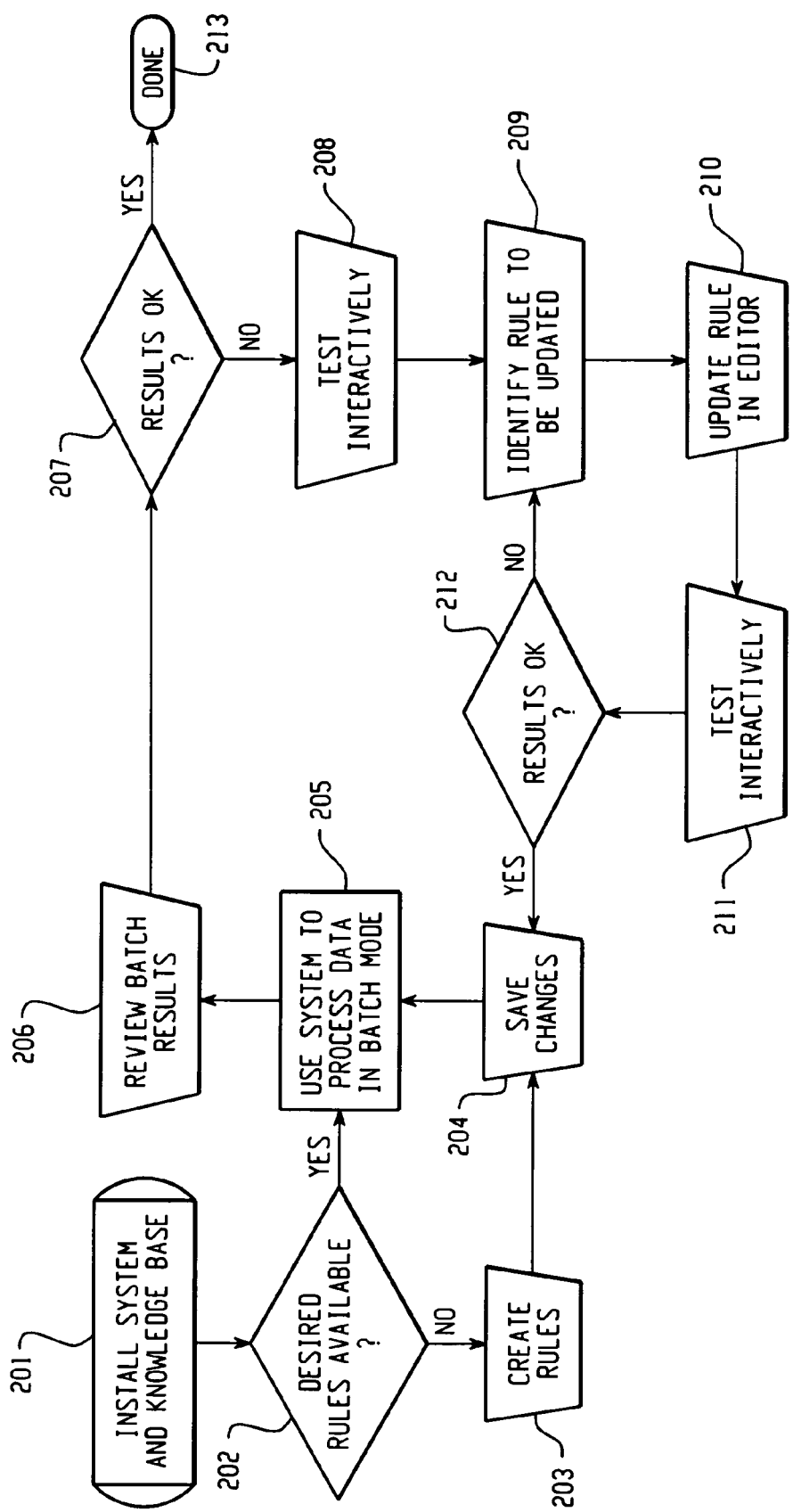
FIG. 5 is a flow chart illustrating a scenario involving a data integrity validation rules customization system.

To further illustrate this, FIG. 5 depicts a scenario wherein a user of the data integrity validation rules customization system customizes a knowledge base for use in the user's enterprise. At process step 201 of the scenario, the user first installs the compiled software application and the knowledge base. If rules defining all desired operations are available in the knowledge base as determined at decision step 202, then the user may begin using the system to perform data integrity validation operations at process step 205. However if rules defining all desired operations are not available in the knowledge base, the user may create the necessary rules using the system's customization tools at process step 203. After changes to the knowledge base have been saved at process step 204, the user may begin using the system to perform data integrity validation operations at process step 205.

After data integrity validation operations have been performed at process step 205, the user may review results of the operations (or a sample of the results if a large amount of data was processed) at process step 206. If results are acceptable as determined at decision step 207, the user may continue to use the system as-is to perform data integrity validation operations until the needs of the user's enterprise change, at which time customizations may be desired.

If initial results are not acceptable to the user, the user may identify data values that were incorrectly processed and use these values as input in the interactive test facility in the system's customization tools at process step 208. The user may enter test data values and view the effect of each rule invoked by an operation. This information can be used to determine which rule or rules should be customized at process step 209. When a rule has been identified as a candidate for customization, the user can update at process step 210 the rule using one of the customization tools' editing facilities. The user may also add new rules that work with existing rules in the same operation.

As customizations are made, the user may use the interactive test interface in the customization tools to verify that changes to rules produce the intended results at process step 211. Once satisfied with the outcome of the customizations as determined at decision step 212, the user may save the changes to the knowledge base so that subsequent operations will use the new and updated rules at process step 204. The user may review the results of subsequent operations to determine whether further customizations are necessary at process step 206. This scenario may be repeated through multiple iterations until desired data integrity validation results are achieved 213.

The knowledge base may contain information such as vocabularies, natural language parsing rules, transformation rules, phonetic reduction rules, and data processing metadata. A separate knowledge base is delivered for each supported locale. The system is able to switch between locale-specific sets of data integrity validation rules as often as necessary when processing records.

Additional scenarios may include the following. Suppose a customer wants to identify duplicate e-mail addresses in a table. In this example, the rules for matching e-mail addresses delivered in the knowledge base are capable of matching e-mail addresses with standard formats like this:
tony.fisher@sas.com However, suppose the rules in the knowledge base are not able to correctly process addresses with a format like this:
Tony Fisher<tony.fisher@sas.com>

The rules for e-mail addresses might not be able to correctly parse such an e-mail address. Therefore the address would be processed incorrectly during matching. To solve this problem, the user extends the natural language parsing rules for e-mail addresses by adding a pattern to the externally located and separate knowledge base in order to represent the second e-mail address format. After this is done, any e-mail address of this format would be correctly parsed, and desired match results would be obtained.

Another scenario may be the following. Suppose a user might want to create data integrity validation rules to process a completely new type of data. For instance, a customer might want to identify records that contain duplicate automobile make/model information. If the separate and externally located knowledge base delivered to the user does not support processing of automobile make/model data, the user can create the necessary rules themselves.

As another scenario, suppose there are potential customers who want to process French data, but there is no knowledge base for the French locale. The vendor can create data integrity validation rules for the French locale in the externally located and separate knowledge base. The new French knowledge base can be shipped to potential customers immediately—there is no need to wait for a new product release.

Figure 6:
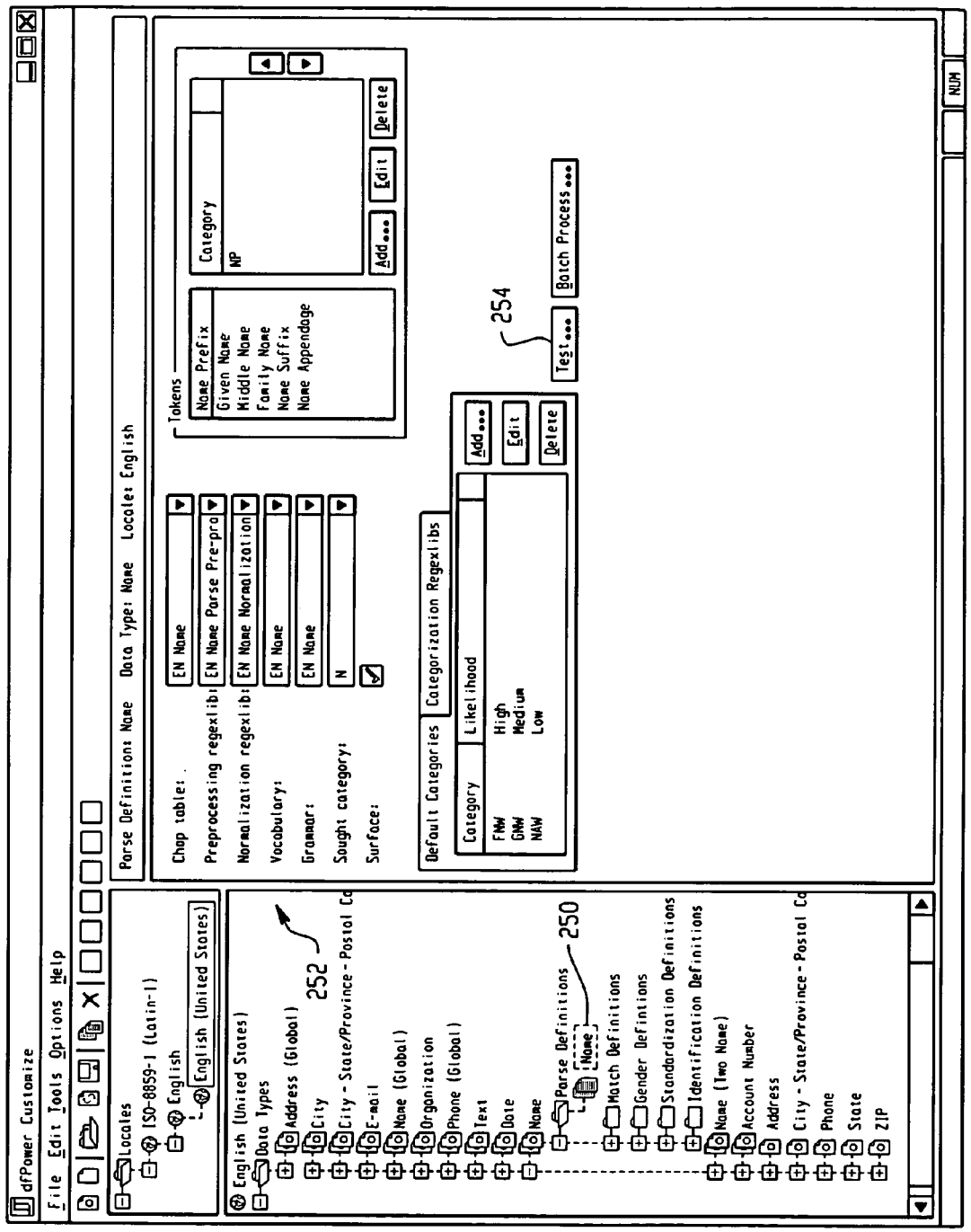

FIGS. 6–18 are graphical user interfaces depicting screens from the data integrity validation rules customization toolset. The interface shown on FIG. 6 allows a user to specify and add data integrity validation rule(s) for different data items. For example, the "Name" data item 250 is selected and the data integrity validation rules for the data item are displayed at 252. The data validation rules may be tested for this data item by clicking on the test button 254.

Figure 7:
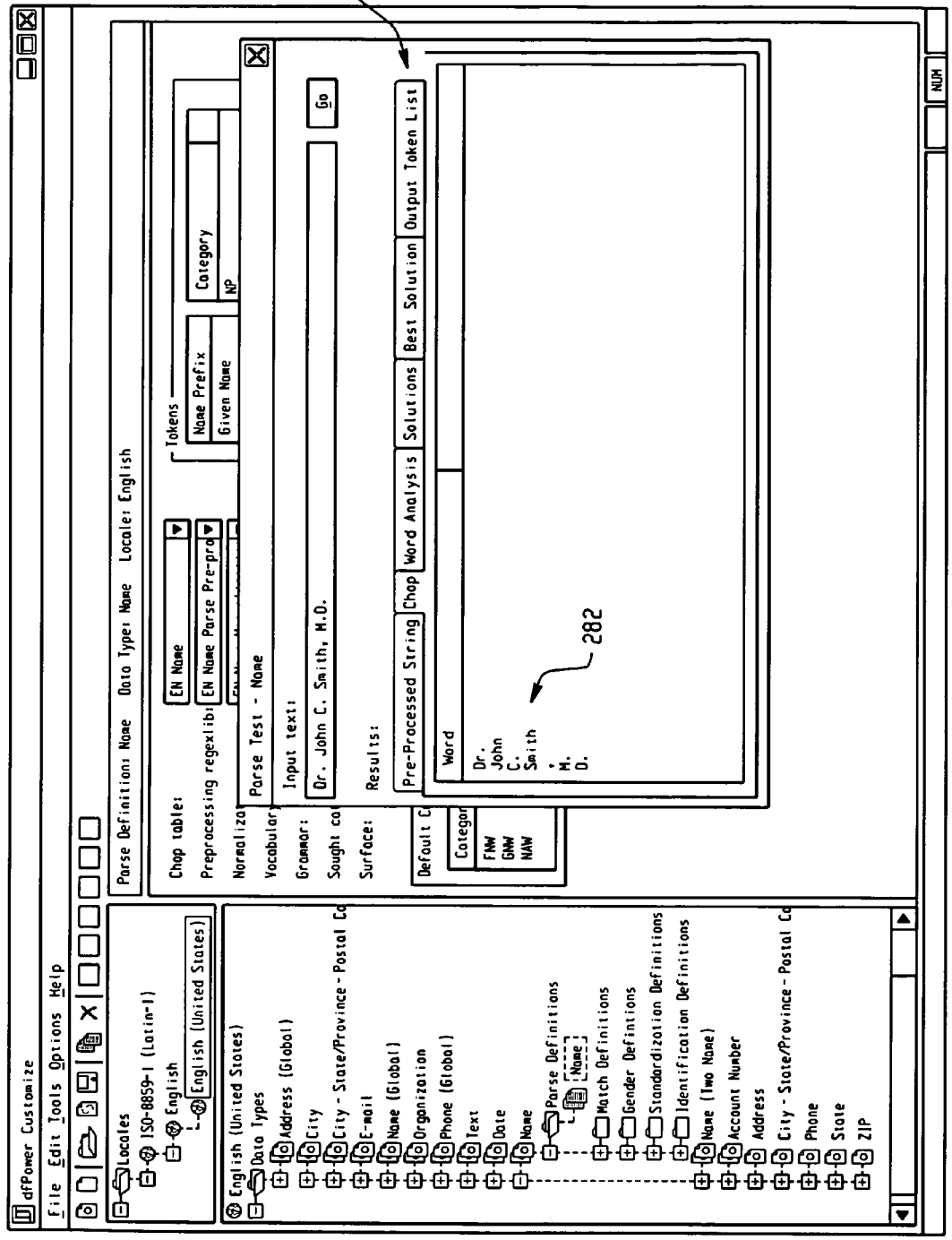
Figure 8:
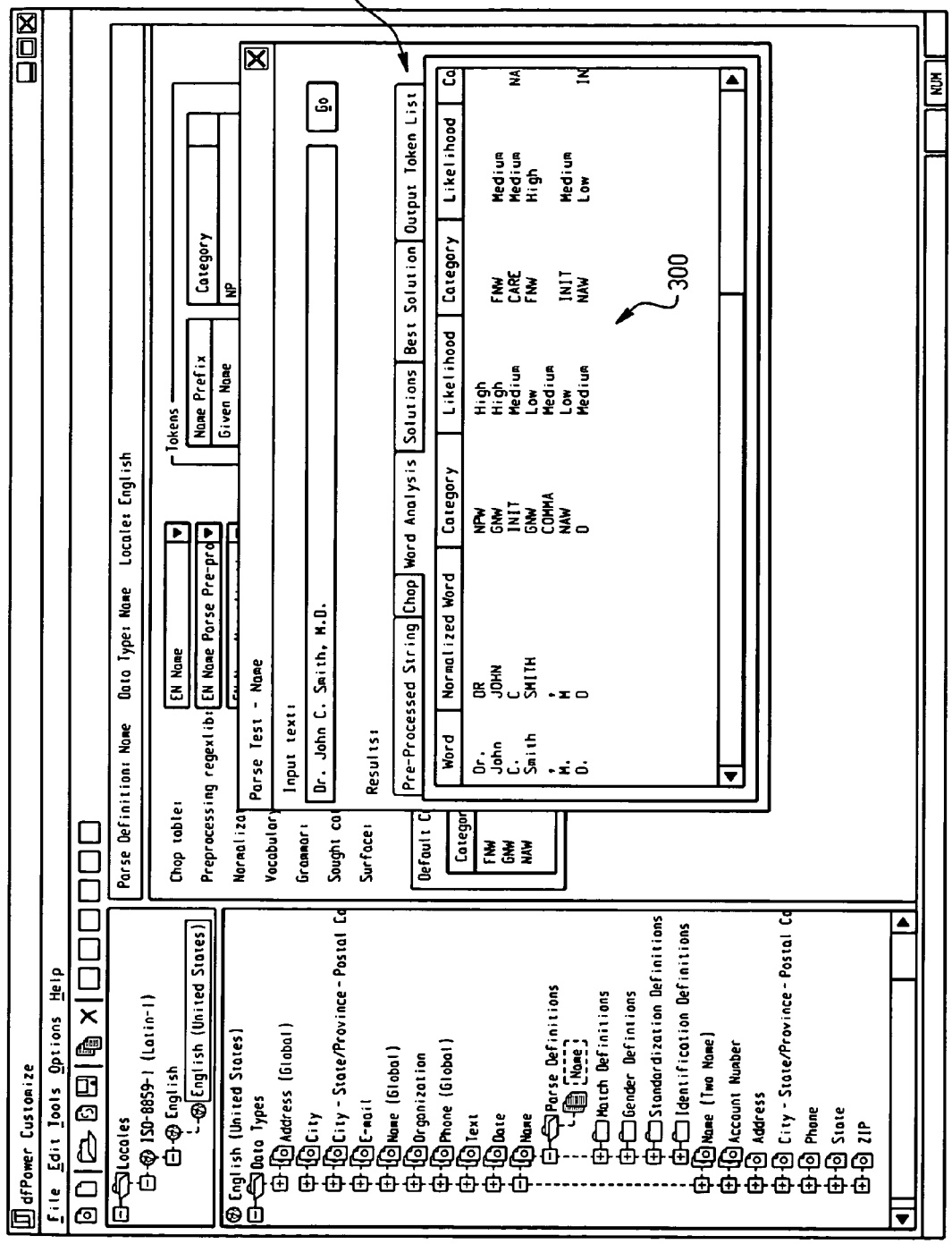

FIG. 7 shows how the various rule processing stages would handle the input text "Dr. John C. Smith, M.D." for this data item. By selection of the chop tab from interface region 280, the chopped results for the input are shown at 282. Selection of the word analysis tab from interface region 280 shows in FIG. 8 the next stage processing results at 300. The results 300 show for each input chopped word what the normalized word is after application of the rules as well as to which category a word may belong. Likelihoods for a category are also provided. For example, the word "Dr." has a normalized word "DR" and after further application of the rules is placed with a high likelihood in the name prefix word (NPW) category.

Figure 9:
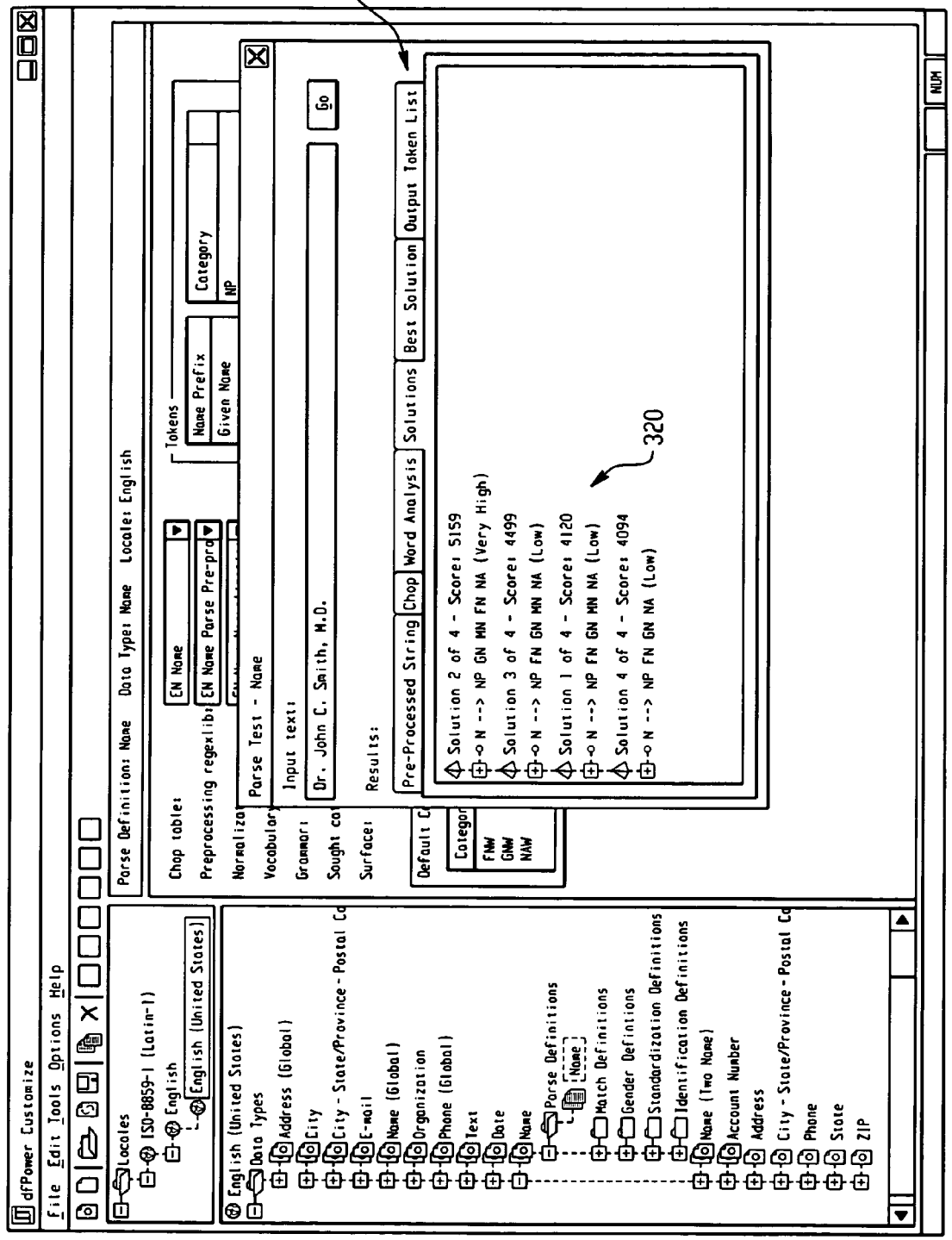

Selection of the solutions tab from interface region 280 shows in FIG. 9 the next stage processing results at 320. The results 320 show the intermediate solutions in applying the rules. In this example, four solutions have been proposed and ranked. A user can view these results and determine that a solution should not have been accorded such a high rank and thus may decide to adjust the priority of the rules.

Figure 10:
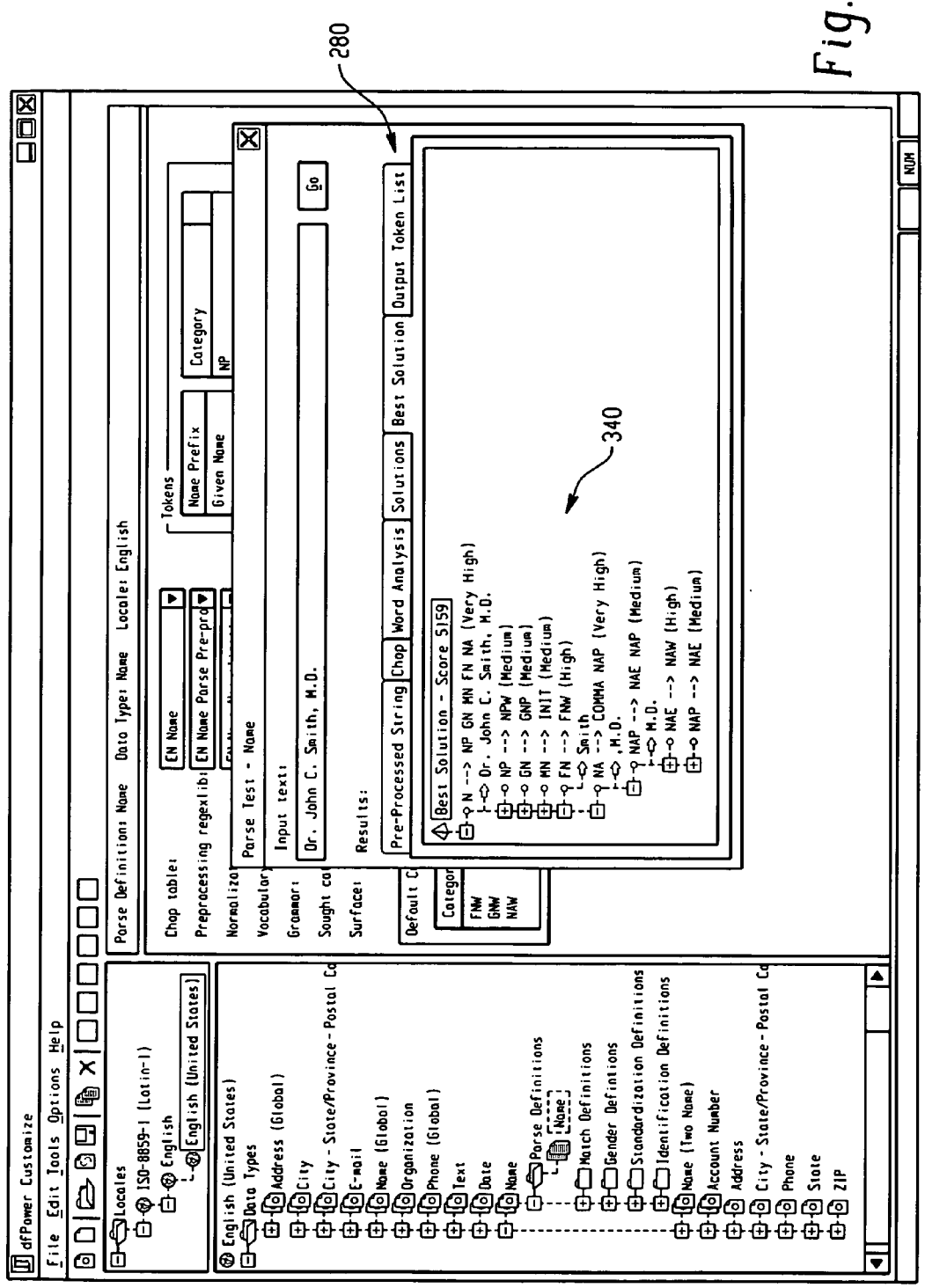

Selection of the best solution tab from interface region 280 shows in FIG. 10 the next stage processing results at 340. The results 340 show that a user can view a detailed breakdown of a solution.

Figure 11:
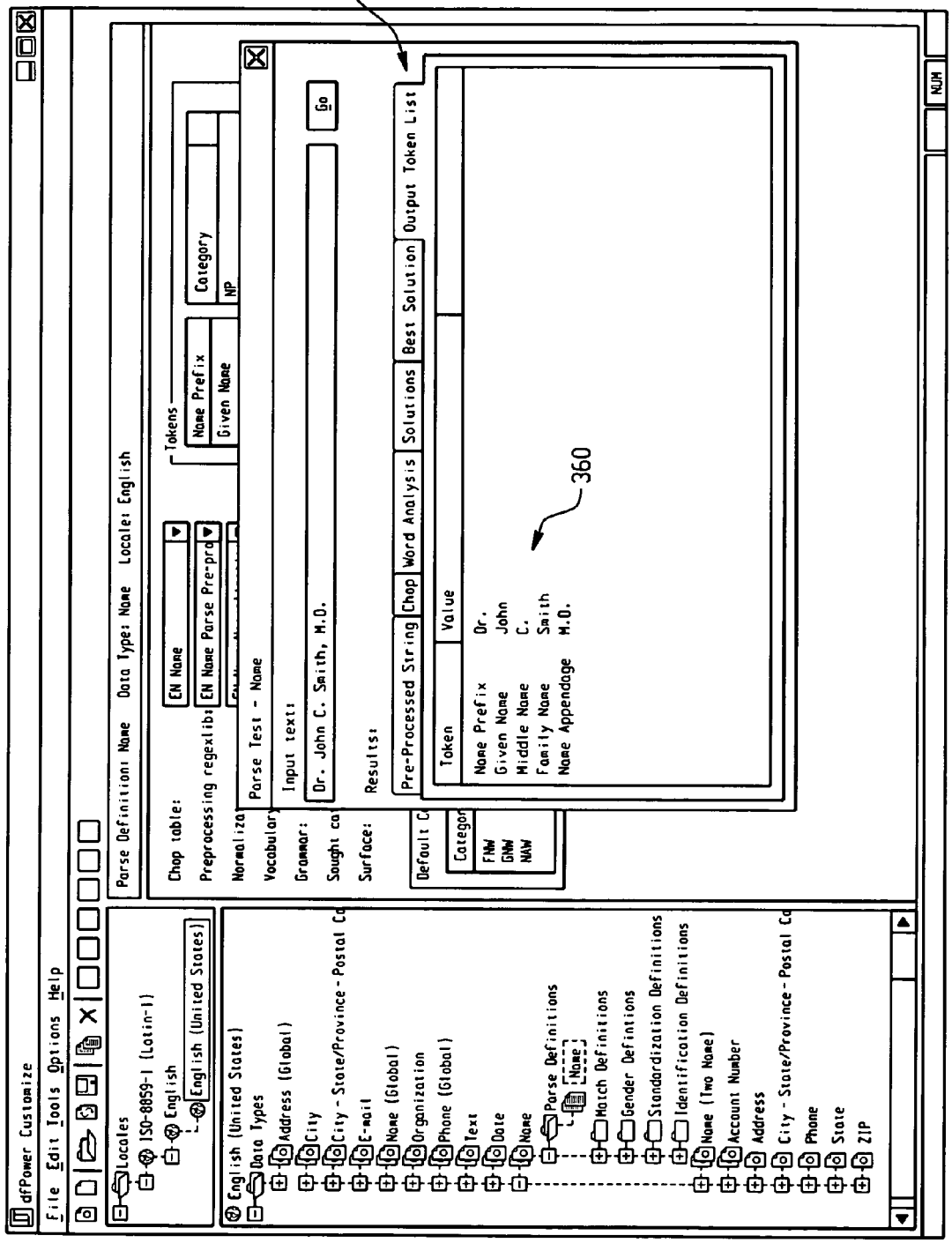

Selection of the output token list tab from interface region 280 shows in FIG. 11 the last stage processing results at 360. The results 360 show how application of the rules would tokenize the input text.

Figure 12:
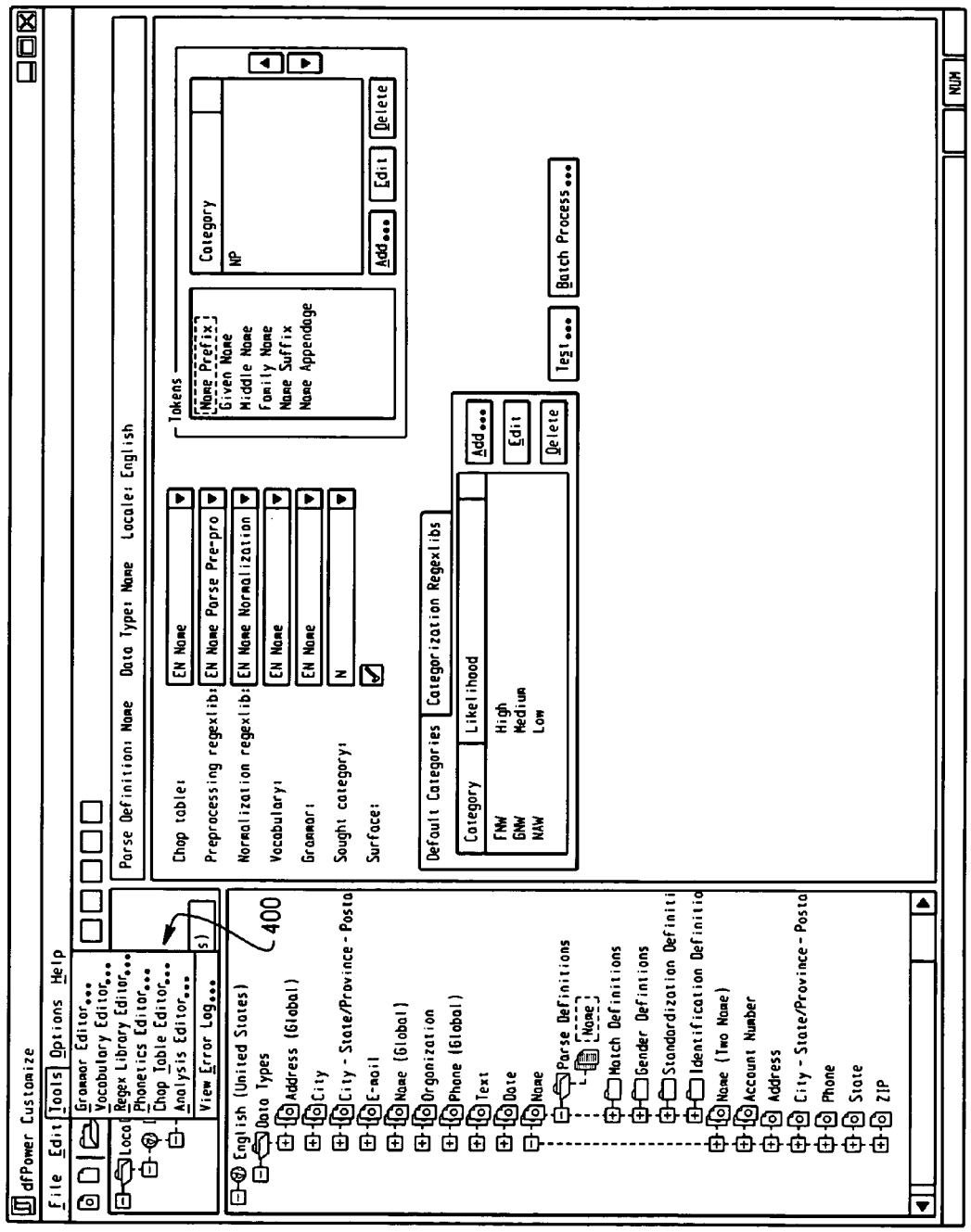
Figure 13:
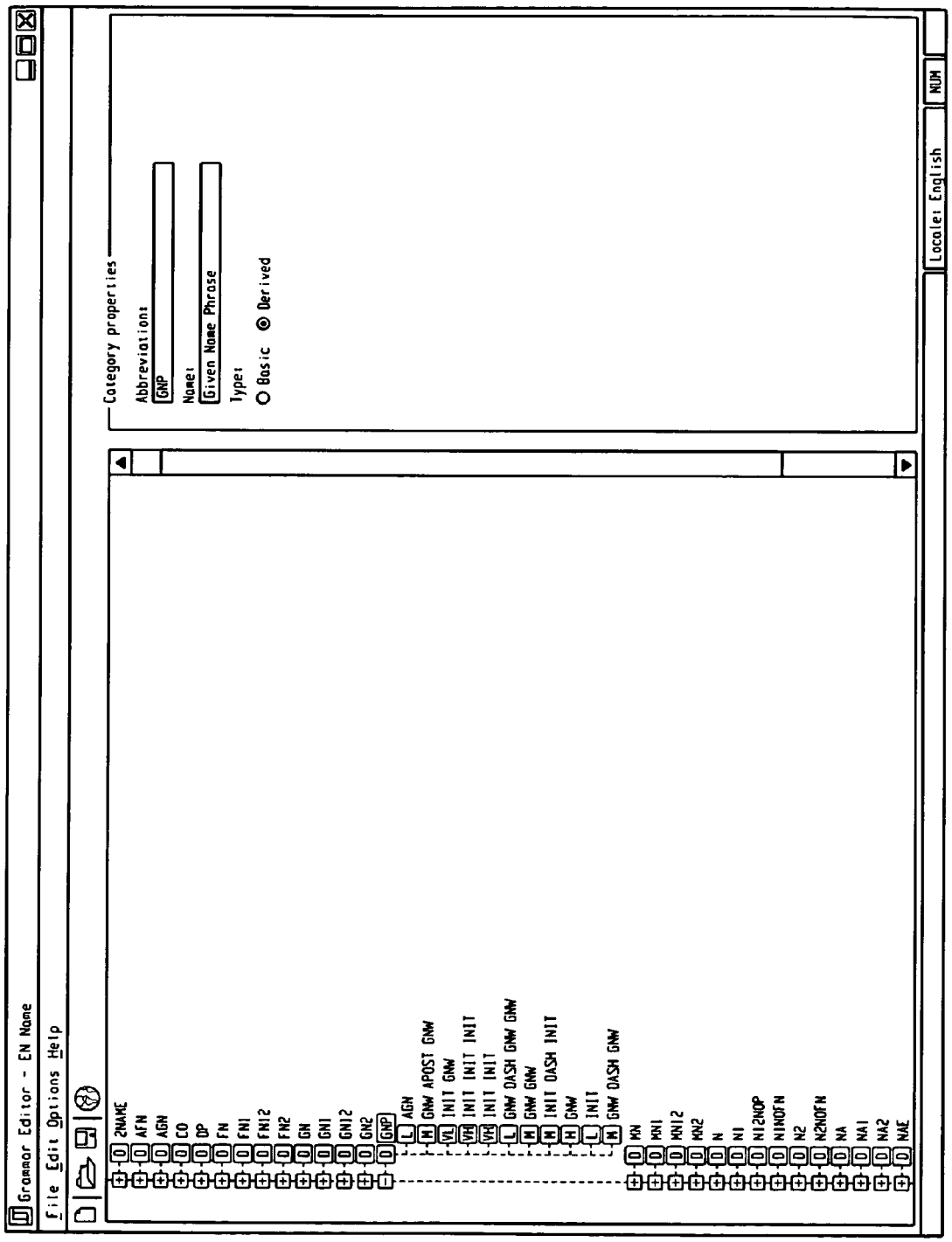
Figure 14:
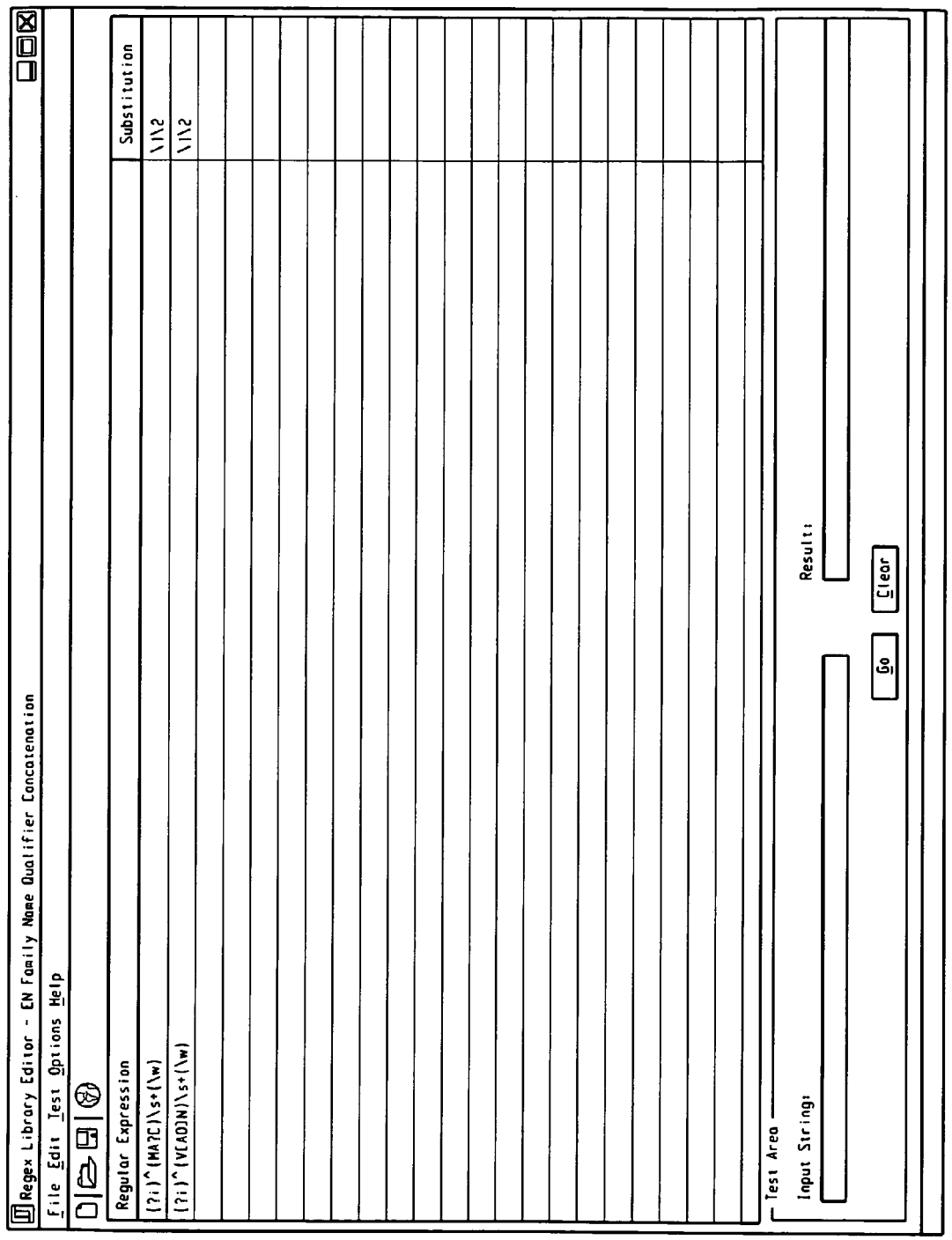
Figure 15:
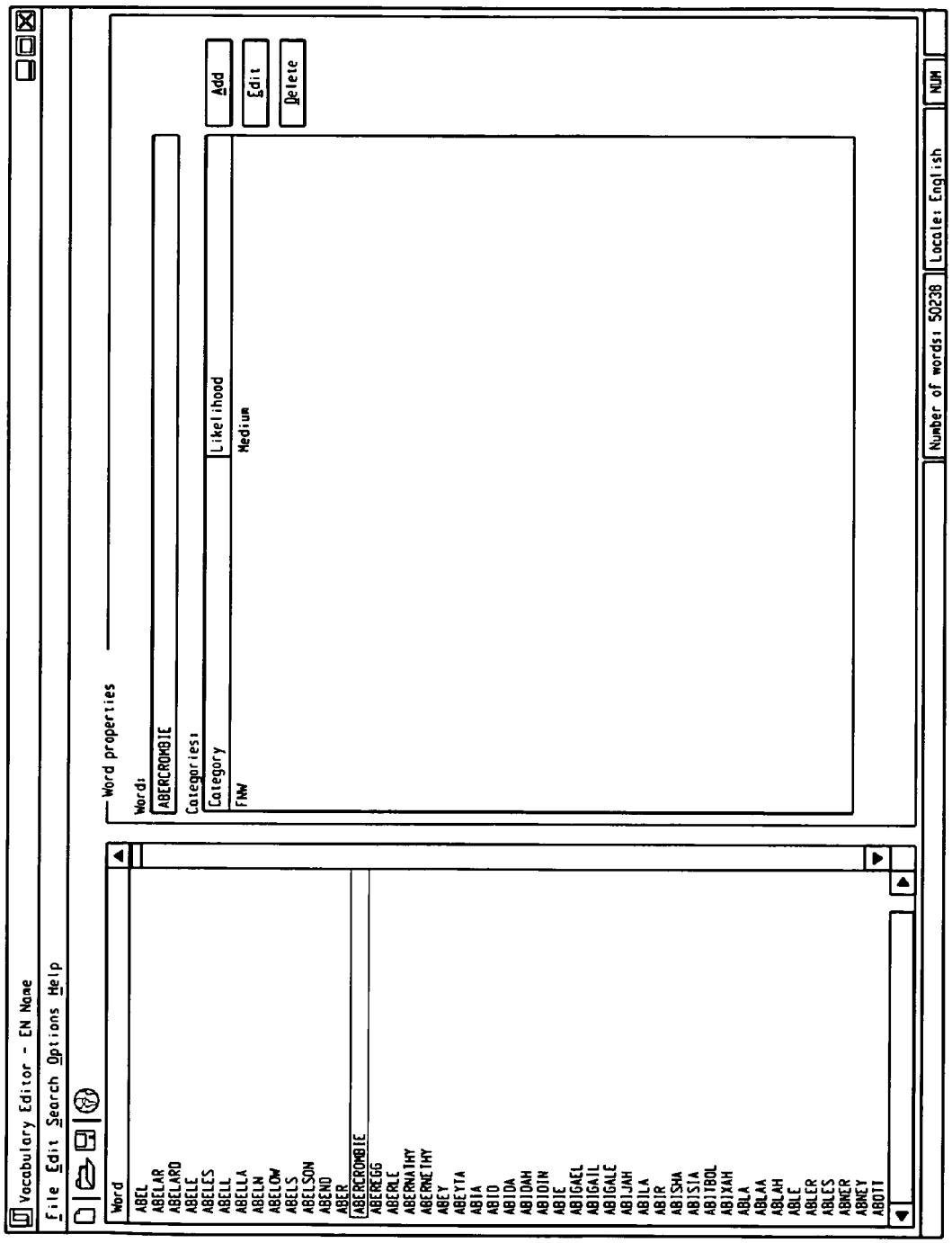
Figure 16:
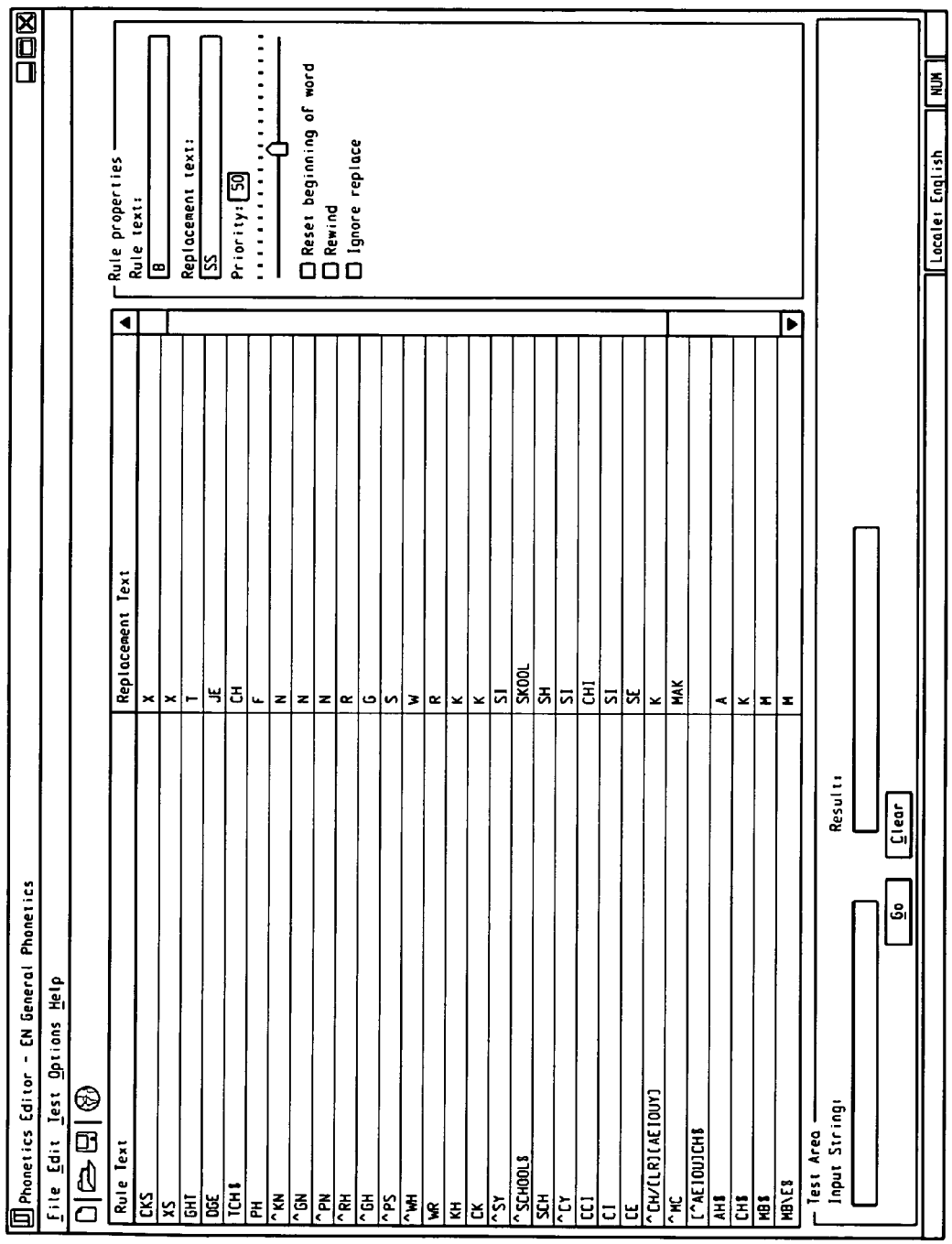
Figure 17:
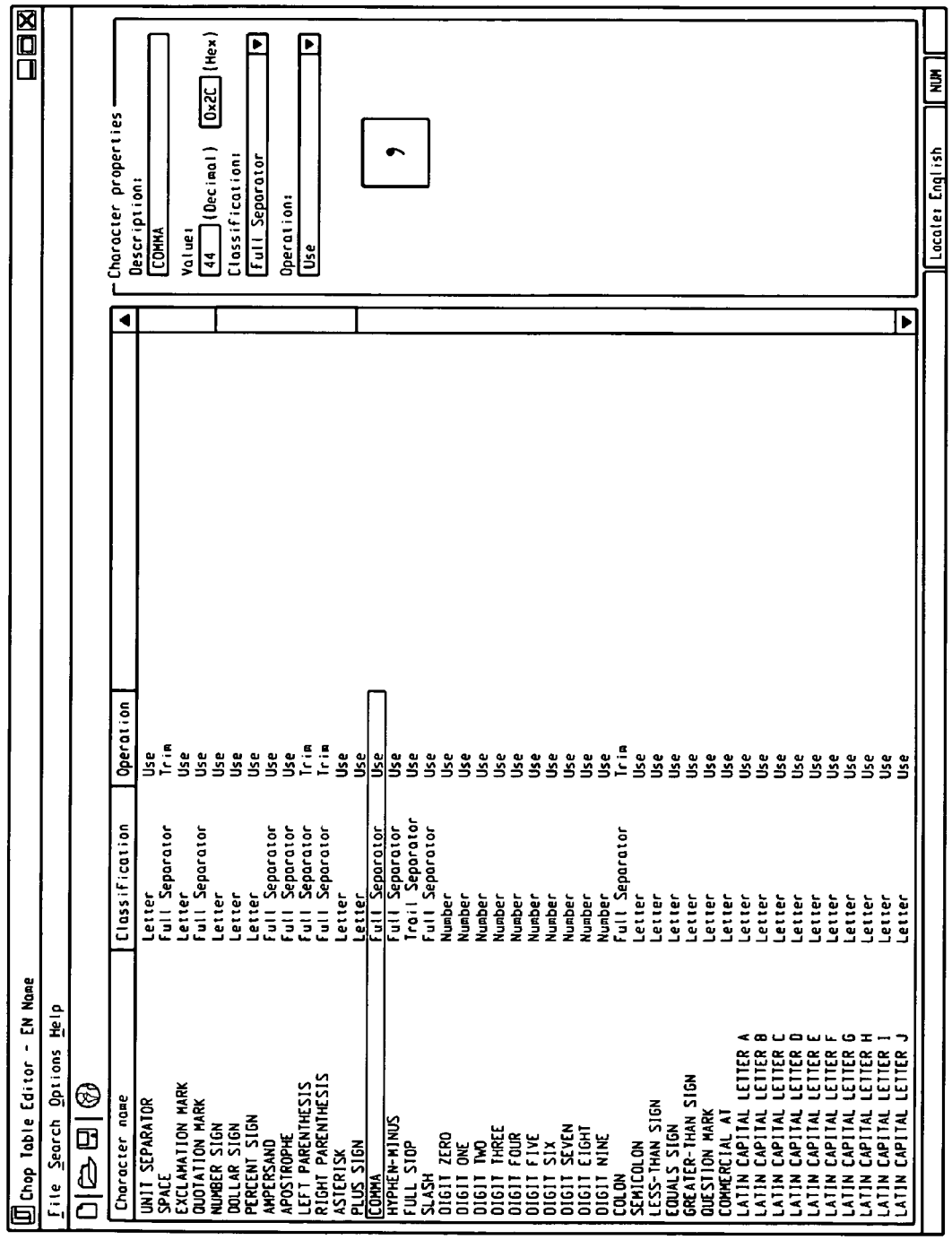

FIG. 12 shows at 400 the different editors available for a particular data item and includes the following: a grammar editor, a vocabulary editor, a regex library editor, a phonetics editor, a chop table editor, and an analysis editor. An example of a grammar editor is shown in FIG. 13 wherein a "Name" item may be derived from several different items, such as a given name word (GNW) item. FIG. 14 shows an example of a regex editor wherein Perl expressions (or other regular expressions) are used to perform replacement operations within patterns. FIG. 15 shows an example of a vocabulary editor wherein for a data item words are placed into one or more categories with an associated likelihood value. FIG. 16 shows an example of a phonetics editor wherein a rule text is associated with a replacement text. For instance, the rule text "PH" and the replacement text "F" will transform the input string "PHUN" into "FUN". FIG. 17 shows an example of a chop table editor wherein different delimiters (e.g., comma) specify how input data should be tokenized. FIG. 18 shows an example of an analysis editor wherein data is standardized. For instance, the input data "PROFESSOR" would be standardized to "PROF".

While examples have been used to disclose the invention, including the best mode, and also to enable any person skilled in the art to make and use the invention, the patentable scope of the invention is defined by the claims, and may include other examples that occur to those skilled in the art. For example, the data integrity validation rules customization system may be used in a software application to manage data in any database or data processing environment. The architecture of the data integrity validation customization system makes it useful for any environment in which there is a need to adapt or evolve rules over the lifetime of the enterprise. As another example, the data integrity validation rules customization system may be utilized with many different types of compiled applications, and the term "compiled" as used herein is broad, so as to include applications utilizing Java compiled byte code as well as other lower level languages (e.g., machine code compiled from source code).

The invention claimed is:

1. A computer-implemented system having a processor, said system for customizing rules used in data integrity validation operations, comprising:
 a data integrity validation application configured for operation upon the processor in order to access the data integrity validation rules to perform the data integrity validation operations,
 a database containing a plurality of data records for processing by the data integrity validation application;
 said processing by the data integrity validation application including receiving the plurality of data records from the database and performing the data integrity validation operations upon the plurality of records that are contained in the database;
 wherein the data integrity validation application is stored in a low level compiled language;
 a knowledge base containing the data integrity validation rules, wherein the knowledge base has a storage location that is separate from and external to the compiled data integrity validation application,
 wherein the separate and external storage location of the knowledge base allows customization of the contained data integrity validation rules without requiring recompilation of the data integrity validation application,
 wherein the data integrity validation application has a data access pathway to the separately stored and externally located knowledge base so that the data integrity validation application may perform the data integrity validation operations upon the plurality of data records.

2. The system of claim 1 wherein the compiled data integrity validation application contains an engine that is capable of accessing the data integrity validation rules in the knowledge base and applying the rules to perform the data integrity validation operations.

3. The system of claim 1 wherein the low level compiled language is not in a human-readable format.

4. The system of claim 1 wherein the data integrity validation application comprises a plurality of software modules, wherein at least one of the software modules performs the data integrity validation operations.

5. The system of claim 1 wherein the separate and external storage location of the knowledge base relative to the compiled data integrity validation application allows the data integrity validation rules to be customized without requiring recompilation of the document management application.

6. The system of claim 1 wherein the knowledge base comprises a database to store the data integrity validation rules.

7. The system of claim 1 wherein the knowledge base comprises a set of flat files to store the data integrity validation rules.

8. The system of claim 1 wherein the knowledge base is extensible in that existing data integrity validation rules may be added or updated.

9. The system of claim 1 wherein the data integrity validation rules are directed to cleansing number-based data.

10. The system of claim 1 wherein the data integrity validation rules are directed to cleansing text-based data.

11. The system of claim 1 wherein the data integrity validation rules comprise semantic cleansing rules.

12. The system of claim 1 wherein the data integrity validation rules are directed to analysis-related data cleansing operations.

13. The system of claim 1 wherein the data integrity validation rules are directed to standardization-related data cleansing operations.

14. The system of claim 1 wherein the data integrity validation rules are directed to augmentation-related data cleansing operations.

15. The system of claim 1 wherein the data integrity validation rules are directed to integration-related data cleansing operations.

16. The system of claim 1 wherein the data integrity validation rules in the knowledge base contain analysis reference materials and transformation specifications.

17. The system of claim 1 wherein a first computer server contains the data integrity validation application and a second computer server contains the knowledge base, wherein a network provides data access between the first and second computer servers.

18. The system of claim 17 wherein the network is an Internet network.

19. The system of claim 17 wherein a webbrowser located on a remote client computer accesses the data integrity validation rules stored in the knowledge base in order to customize the data integrity validation rules.

20. The system of claim 1 further comprising:
customization tools that access the data integrity validation rules in the knowledge base and contains at least one user interface to customize the rules.

21. The system of claim 20 wherein the customization tools contains at least one user interface related to testing the data integrity validation rules stored in the knowledge base.

22. The system of claim 20 wherein the customization tools contains at least one user interface related to debugging the data integrity validation rules stored in the knowledge base.

23. The system of claim 22 wherein the user interface is used to view intermediate results of the data integrity validation operations.

24. The system of claim 1 further comprising:
an import and export software facility for transferring data integrity validation rules from the knowledge base to another knowledge base for use in data integrity validation operations.

25. The system of claim 1 wherein the data integrity validation rules comprise data cleansing rules.

26. The system of claim 1 wherein the data integrity validation rules comprise data integration rules.

27. The system of claim 1 wherein the data integrity validation application uses the data integrity validation rules to determine whether duplicate records exist within the plurality of records that are contained in the database.

28. The system of claim 1 wherein another database contains a plurality of data records, wherein the data integrity validation application uses the data integrity validation rules to consolidate the plurality of data records contained within the databases;
wherein the consolidation of the plurality of data records contained within the databases results in a merging of the data records that were contained within the databases and wherein duplicate data records between the databases are purged.

29. A computer-implemented method for managing rules used in data integrity validation operations, comprising the steps of:
retrieving from a knowledge base a data integrity validation rule;
modifying the retrieved data integrity validation rule;
storing the modified data integrity validation rule so that the modified data integrity rule may be used in a data integrity validation operation to be performed by a data integrity validation application, wherein the data integrity validation application is stored in a low level compiled language,
wherein the data integrity validation application retrieves from a database a plurality of data records for processing by the data integrity validation application;
said processing by the data integrity validation application including performing the data integrity validation operation upon the plurality of records that are contained in the database;
wherein the knowledge base has a storage location that is separate from and external to the compiled data integrity validation application,
wherein the separate and external storage location of the knowledge base allows modification of the stored data integrity validation rules without requiring recompilation of the data integrity validation application.

30. A computer-implemented apparatus for managing rules used in data integrity validation operations, comprising:
means for retrieving from a knowledge base a data integrity validation rule;
means for modifying the retrieved data integrity validation rule;
means for storing the modified data integrity validation rule so that the modified data integrity rule may be used in a data integrity validation operation to be performed by a data integrity validation application, wherein the data integrity validation application is stored in a low level compiled language,
wherein the data integrity validation application retrieves from a database a plurality of data records for processing by the data integrity validation application;
said processing by the data integrity validation application including performing the data integrity validation operation upon the plurality of records that are contained in the database;
wherein the knowledge base has a storage location that is separate from and external to the compiled data integrity validation application,
wherein the separate and external storage location of the knowledge base allows modification of the stored data integrity validation rules without requiring recompilation of the data integrity validation application.

* * * * *

UNITED STATES PATENT AND TRADEMARK OFFICE
CERTIFICATE OF CORRECTION

PATENT NO. : 7,318,162 B2  Page 1 of 1
APPLICATION NO. : 10/324134
DATED : January 8, 2008
INVENTOR(S) : Rineer et al.

It is certified that error appears in the above-identified patent and that said Letters Patent is hereby corrected as shown below:

In column 11, line 32, delete "webbrowser" and insert -- web browser --.

Signed and Sealed this

Twenty-ninth Day of April, 2008

JON W. DUDAS
*Director of the United States Patent and Trademark Office*